United States Patent [19]
Kishikawa et al.

[11] Patent Number: 5,722,778
[45] Date of Patent: Mar. 3, 1998

[54] BEARING DEVICE FOR VERTICAL ROTATING MACHINE

[75] Inventors: Tadahiko Kishikawa; Hisao Uekusa, both of Tokyo, Japan; Pierre Gauvin; ReJean Jodoin, both of Quebec, Canada

[73] Assignee: Ebara Corporation, Tokyo, Japan

[21] Appl. No.: 787,922

[22] Filed: Jan. 23, 1997

[30] Foreign Application Priority Data

Jan. 24, 1996 [JP] Japan .................................. 8-030056

[51] Int. Cl.[6] .................................................. F16C 33/76
[52] U.S. Cl. ...................................... 384/471; 384/478
[58] Field of Search ........................... 384/471, 478, 384/473, 134, 133, 132

[56] References Cited

U.S. PATENT DOCUMENTS

| 4,382,638 | 5/1983 | Andoh et al. | 384/478 |
|---|---|---|---|
| 5,312,192 | 5/1994 | Shimuzu et al. | 384/478 |

*Primary Examiner*—Lenard A. Footland
*Attorney, Agent, or Firm*—Wenderoth, Lind & Ponack

[57] ABSTRACT

A bearing device for supporting a rotating shaft substantially arranged in a vertical direction in a vertical rotation machine is disclosed. The bearing device enables the vertical rotation machine to operate in a stable and contamination-free condition by preventing leakage of lubricant as well as to decrease the lubricant consumption. The bearing device comprises a roller bearing for supporting the rotating shaft and a labyrinth seal provided below the bearing. An oil dam is provided at a bottom portion of a bearing chamber to surround the sealing. An oil suction pipe for discharging lubricant from the oil dam, a sealing gas supply passage for supplying sealing gas into the bearing chamber from below by way of the sealing, and a sealing gas vent port opening at an upper area of the bearing chamber are provided.

11 Claims, 2 Drawing Sheets

BEARING DEVICE FOR VERTICAL ROTATING MACHINE

BACKGROUND OF THE INVENTION

1. Field of the Invention

The present invention relates to a bearing device for supporting a vertical rotating shaft of a vertical rotating machine such as a gas turbine.

2. Description of the Related Art

In a driving apparatus using a gas turbine machine, a bearing device for supporting a rotating shaft is usually placed in a high temperature environment. To maintain a leakage-free operation, a seal mechanism is provided to the bearing device, as described in Japanese Patent Application Publication Laid Open No. S61-142328. In this article, a sealing air discharge passage is provided, in addition to a lubricant oil discharge port, to open at the upper portion of the rotating machine for reducing the generation of oil mist within a lubricant chamber.

In a conventional flood control pump driven by a gas turbine placed in a pumping station, the gas turbine is usually placed with its rotation shaft aligned horizontal, resulting in a large floor area occupation. Therefore, it seems advantageous to place the gas turbine with its rotating shaft aligned vertical. However, if the conventional bearing device such as disclosed in the above described article is adapted to this type of gas turbine, a large amount of lubricant oil will leak along the rotating shaft to flow into the air and/or hot gas passage. This will cause increased consumption of the lubricant oil and unstable combustion, as well as contamination by the lubricant oil on the turbine side.

SUMMARY OF THE INVENTION

It is an object of the present invention, therefore, to provide a bearing device enabling a vertical rotation machine to operate in a stable and contamination-free condition by preventing leakage of lubricant as well as to decrease the lubricant consumption.

The object has been accomplished by a bearing device for supporting a rotating shaft substantially arranged in a vertical direction comprising: a bearing means for supporting the rotating shaft; a sealing means provided below the bearing means; a bearing housing defining a bearing chamber surrounding the rotating shaft for enclosing the bearing means and the sealing means; an oil supply pipe for supplying lubricant to the bearing means; an oil dam provided at the bottom portion of the bearing chamber to surround the sealing means; an oil suction pipe for discharging lubricant from the oil dam; a sealing gas supplying means for supplying sealing gas into the bearing chamber from below by way of the sealing means; and a sealing gas vent port opening at an upper area of the bearing chamber.

According to such a construction, a sealing gas supplying means such as a self-driven or externally-driven compressor supplies a sealing gas such as air or nitrogen or other inert gas into the bearing chamber from below by way of the sealing means for sealing around the rotating shaft or for cooling, and lubricant oil distributed by oil supply pipes lubricates the bearing. The sealing gas with oil mist during this process first releases oil in the bearing chamber, and further flows upstream within the chamber toward the vent pipe thereby further releasing oil into the oil dam. The oil is discharged from the oil dam through one or more oil suction pipe inserted into the chamber from above, for example, so as not to overflow from the oil dam.

Sealing gas flowing into the sealing means located inside the oil dam from below prevents leakage of the oil or oil mist through the sealing means to the area below. By making the sealing gas flow from a sealing gas vent pipe provided through an upper portion of the sealing chamber, the amount of the discharged oil mist sent to the oil pipe or oil pump as well as the gas flow can be released to adjust the proper gas pressure.

In another aspect of the invention, a gas passage may be provided to open through a wall of said bearing housing above said bearing means for flowing said sealing gas to bypass said bearing means. Such a feature of the invention can protect the bearing means from seizing occurring from a large loss of lubricant stuck to the bearing caused by an excessive sealing gas supply, thereby facilitating lubrication and cooling of the bearing means.

DESCRIPTION OF THE PREFERRED EMBODIMENTS

Figure 1:
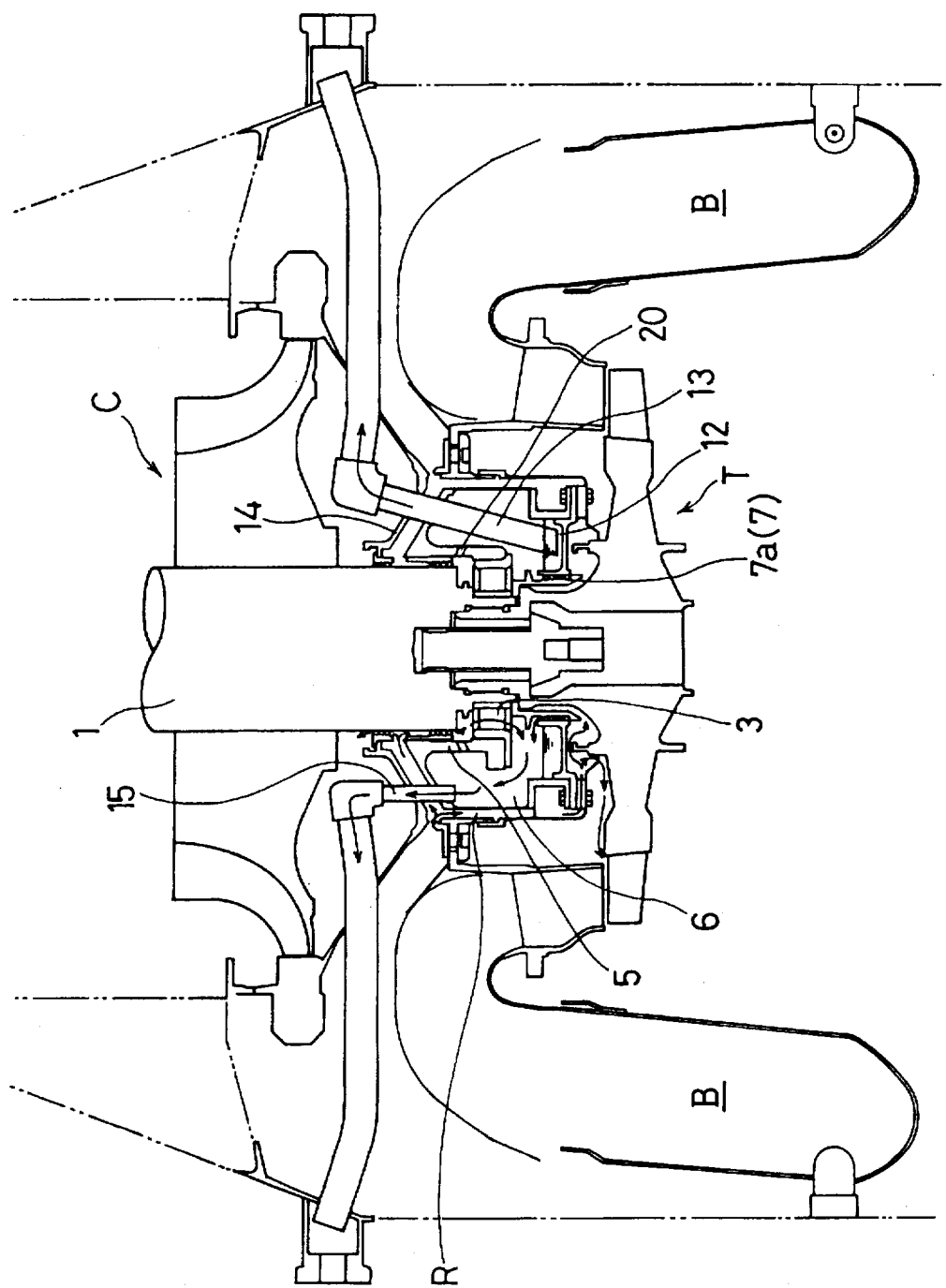
FIG. 1 shows a central portion of the bearing device according to the present invention applied to a vertical machine.
Figure 2:
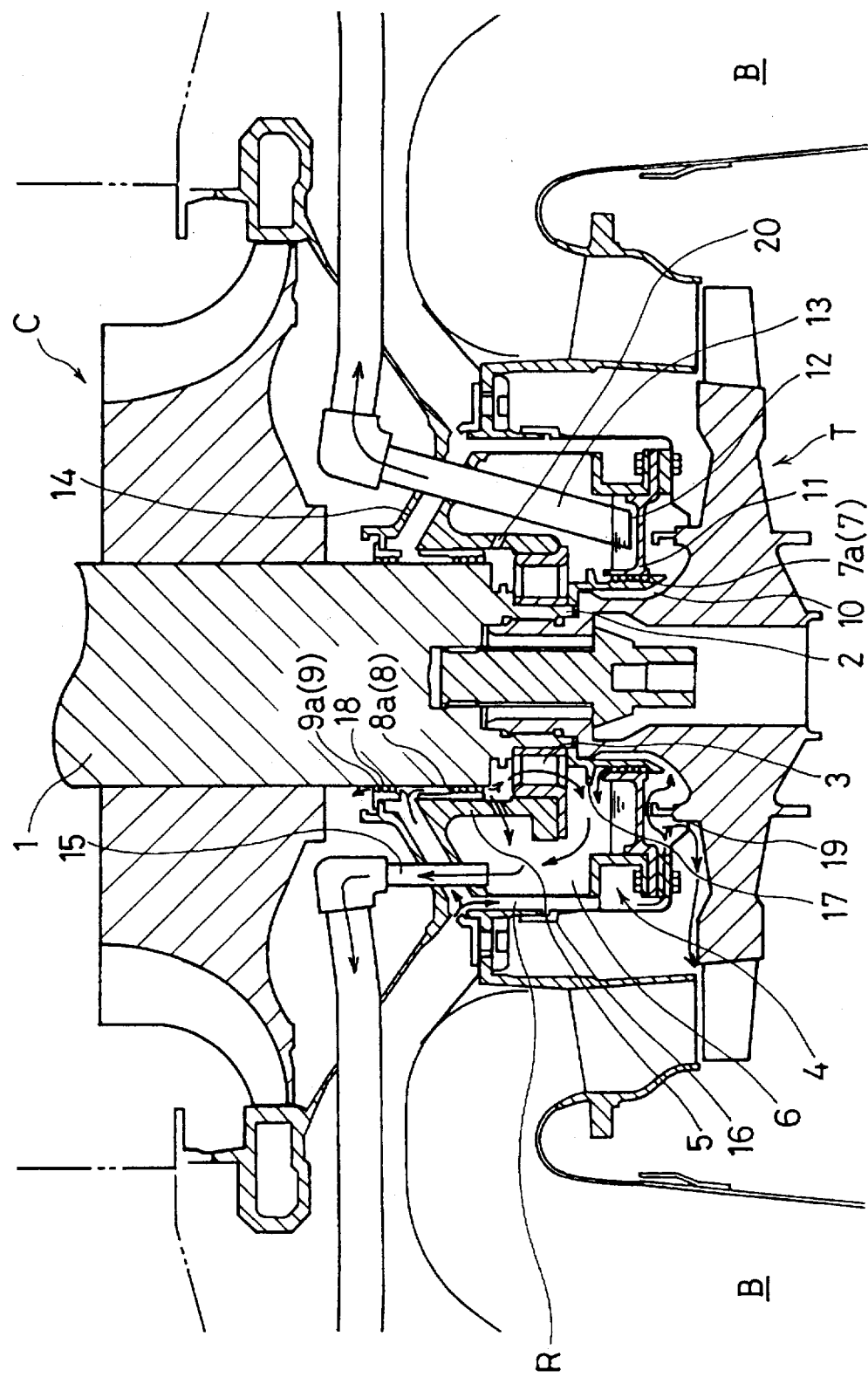
FIG. 2 shows an enlarged view of the main portion of FIG. 1.

FIGS. 1 and 2 show an essential central portion of the bearing device for a vertical rotating machine according to an embodiment of the present invention. The unshown area above FIG. 1 accommodates a compressor section C, and a turbine section T is in an area just below the shown part which is surrounded by a combustion chamber B. FIG. 2 is an enlarged view of the central portion of FIG. 1.

A vertically arranged rotating shaft 1 comprises a compressor impeller or turbine disk blades mounted thereon and is supported at its upper end by another unshown bearing. A small diameter portion 2 is formed by a step in an area adjacent the lower end of the rotating shaft 1, and a roller bearing 3 is arranged around the small diameter portion 2 for supporting the rotating shaft 1. A bearing housing 4 is constructed so as to surround the whole lower end portion of the rotating shaft 1. The inner wall of the bearing housing 4 is separated in an upper part 5 and a lower part 11. The roller bearing 3 is mounted on the upper inner wall 5 of the bearing housing 4, and the bearing housing 4 defines an annular-shaped bearing chamber 6 for installing the roller bearing 3.

The bearing housing 4 is provided with oil supply pipes and lubricant spray nozzles (not shown) for lubrication of necessary part such as the roller bearing 3. Sealing means exemplified as labyrinth seals 7, 8, 9 are provided at both areas above and under the roller bearing 3 for preventing the leakage of lubricant oil. The lower sealing means 7 is arranged between seal fins 7a formed on the outer surface of a cylindrical seal element 10 attached to the rotating shaft 1 and the lower inner wall 11 of the bearing housing 4. The upper sealing means is comprised of an upper portion 9 and a lower portion 8, and is formed by seal fins 8a and 9a formed on the inner surface of the upper inner wall 5 and the outer surface of the rotating shaft 1. A sealing gas passage 20 is formed on the bearing housing wall above the roller bearing 3.

An oil dam 12 for storing a fixed amount of lubricant therein is formed at the bottom of the bearing housing 4 which is dammed by the lower inner wall 11. A suction pipe 13 for discharging lubricant oil from the oil dam 12 is inserted into the oil dam 12 through a top cover plate 14 of the bearing housing 4, which is connected to an unshown scavenge pump.

The bearing housing 4 is provided with a sealing gas supplying means for supplying a sealing gas into the bearing chamber 6 from the surrounding area by way of the sealing means 7, 8, 9 and a sealing gas vent pipe opening at one end in an upper area of the bearing chamber, thereby circulating ventilation air within the bearing chamber. The sealing gas supplying means is exemplified as a passage for distributing a portion of compressed air discharged form the compressor C. The passage branches off at a space R which is defined between the bearing housing 4 and an outer cover 16 coaxially arranged therewith, in both upward and downward directions. The downward passage is guided along the bottom surface of the bearing housing 4 to communicate with the bearing chamber 6 via the lower sealing means 7. The upward passage is guided to the area between the two upper sealing means 8, 9 to communicate with the bearing chamber 6. Gas passages 18, 19 are provided for releasing a part of the sealing gas into the gaps at the "upper" upper sealing means 9 and at an inner end of the cover 16 respectively. The sealing gas vent pipe 15 communicates with the outer environment by way of an oil mist separator.

The operation of the bearing device thus constructed will be described hereinbelow. By the rotation of the rotating shaft 1, lubricant oil is supplied through the oil supply pipe and sprayed from the lubricant spray nozzles to lubricate the roller bearing 3. Then, a portion of lubricant oil deposits on the inner wall of bearing housing 4 and drips down by the gravity into the oil dam 12 and is reserved therein, and another portion of lubricant oil floats in the air in the bearing chamber 6 as mist. Lubricant oil in the oil dam 12 is discharged by a scavenge pump by way of the suction pipe 13 inserted therein so as to keep the amount at a constant level.

The sealing gas flows through the upper and lower sealing means 7, 8 and 9, and the lower flow hits a projection (reflecting member) 17 to be directed toward the oil dam 12. A portion of the upper flow flows through a sealing gas passage opening 20 toward the oil dam 12, and another portion flows through the roller bearing 3 toward the oil dam 12. The sealing gas absorbs the lubricant oil in the form of oil mist during the process, separates a portion of it in a process of reversing its course upward to above the oil dam 12, and is discharged through the sealing gas vent pipe 15. This discharge-after-separation process makes it possible to reduce amount of the discharged lubricant oil as well as the size of the lubricant suction pipe 13 and the capacity of unshown scavenge pump.

During the process described above, sealing gas flows through the lower labyrinth seal 7 to prevent the lubricant oil in a form of oil mist or liquid in the oil dam 12 from flowing downward along the rotating shaft 1, and thus creating a stable lubrication and rotation condition for a vertical rotating machine as well as preventing contamination caused by the lubricant flowing in the downward area. Further, by supplying a sealing gas into the gaps at the lower labyrinth seal portion 7 and the upper labyrinth seal portions 8, 9 and flowing it into the bearing chamber 6, an improved sealing effect around the rotating shaft 1 can be obtained.

Since the lower labyrinth seal 7 comprises seal fins 7a on the rotating side, the lubricant oil absorbed in the lower sealing portion 7 is easily transferred toward outer peripheral by centrifugal force so that it is easily returned to the bearing chamber 6 by being carried by a sealing gas. And by releasing a portion of sealing gas supplied to the upper sealing portions 7, 8 out of the bearing chamber 6 through the upper and lower sealing gas passages 18, 19, residual amount of gas in the bearing chamber 6 is properly adjusted to prevent the excessive supply of the gas in the chamber.

As described above, since the lubricant oil is stored in the oil dam, and a sealing gas flows into the lower sealing portion provided inside of the oil dam, downward leakage of lubricant oil or oil mist by way of the lower sealing portion is prevented. Thus, it is possible to lower the lubricant consumption and conduct a stable and contamination-free operation of the vertical rotating machine. Further, by discharging the gas from a gas vent port provided at the upper portion of the bearing chamber, it is possible to reduce the amount of discharged mist and gas so as to save the facility cost for the oil suction pipes or the scavenge pump.

What is claimed is:

1. A bearing device for supporting a rotating shaft substantially arranged in a vertical direction comprising:
    a bearing means for supporting said rotating shaft;
    a sealing means provided below said bearing means;
    a bearing housing defining a bearing chamber surrounding said rotating shaft for enclosing said bearing means and said sealing means;
    an oil supply pipe for supplying lubricant to said bearing means;
    an oil dam provided at the bottom portion of said bearing chamber to surround said sealing means;
    an oil suction pipe for discharging lubricant from said oil dam;
    a sealing gas supplying means for supplying sealing gas into said bearing chamber from below by way of said sealing means; and
    a sealing gas vent port opening at an upper area of said bearing chamber.

2. A bearing device according to claim 1, further comprising a gas passage opening through a wall of said bearing housing above said bearing means for flowing said sealing gas to bypass said bearing means.

3. A bearing device according to claim 1 further comprising a reflecting member for reflecting said sealing gas passing through said sealing means to flow over said oil dam.

4. A bearing device according to claim 1, wherein said sealing means comprises a labyrinth seal.

5. A bearing device according to claim 4, wherein said labyrinth seal comprises fins provided on said rotating shaft.

6. A vertical rotation machine having a rotating shaft substantially arranged in a vertical direction comprising:
    a bearing means for supporting said rotating shaft;
    a sealing means provided below said bearing means;
    a bearing housing defining a bearing chamber surrounding said rotating shaft for enclosing said bearing means and said sealing means;
    an oil supply pipe for supplying lubricant to said bearing means;
    an oil dam provided at the bottom portion of said bearing chamber to surround said sealing means;

an oil suction pipe for discharging lubricant from said oil dam;

a sealing gas supplying means for supplying sealing gas into said bearing chamber from below by way of said sealing means; and a sealing gas vent port opening at an upper area of said bearing chamber.

7. A vertical rotation machine according to claim 6, further comprising a gas passage opening through a wall of said bearing housing above said bearing means for flowing said sealing gas to bypass said bearing means.

8. A vertical rotation machine according to claim 6, further comprising a reflecting member for reflecting said sealing gas passing through said sealing means to flow over said oil dam.

9. A vertical rotation machine according to claim 6, wherein said sealing means comprises a labyrinth seal.

10. A vertical rotation machine according to claim 9, wherein said labyrinth seal comprises fins provided on said rotating shaft.

11. A vertical rotation machine according to claim 6, further comprising a compressor section and a gas turbine section, wherein said bearing section is provided between said compressor section and said gas turbine section.

* * * * *

UNITED STATES PATENT AND TRADEMARK OFFICE
CERTIFICATE OF CORRECTION

PATENT NO. :  5,722,778
DATED      :  March 3, 1998
INVENTOR(S):  Tadahiko KISHIKAWA et al.

It is certified that error appears in the above-identified patent and that said Letters Patent is hereby corrected as shown below:

Column 5, line 5, change "scaling" to --sealing--.

Signed and Sealed this

Thirtieth Day of June, 1998

Attest:

BRUCE LEHMAN

Attesting Officer    Commissioner of Patents and Trademarks